Feb. 10, 1970 G. A. SHEWMAKE 3,494,820
PATCH FOR REPAIRING PUNCTURES IN INFLATED ARTICLES
AND ARTICLE SO REPAIRED
Filed June 7, 1966
FIG.1
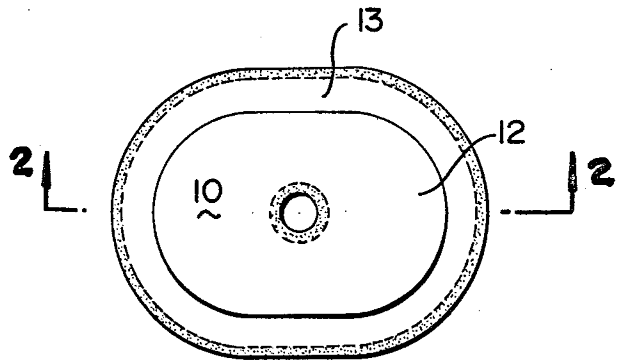
FIG.2
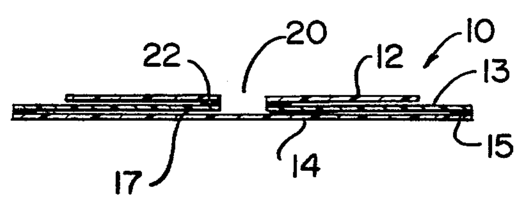
FIG.4
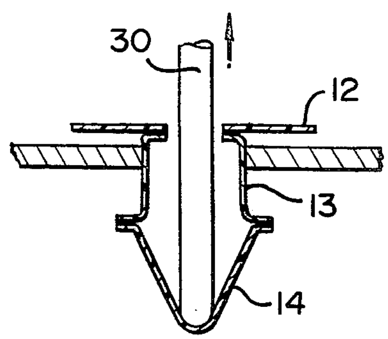
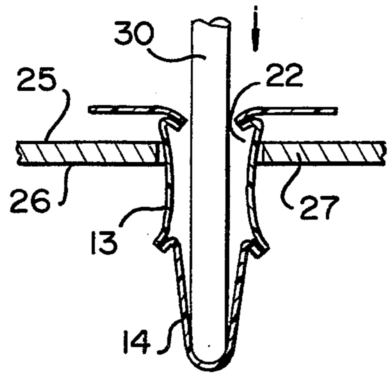
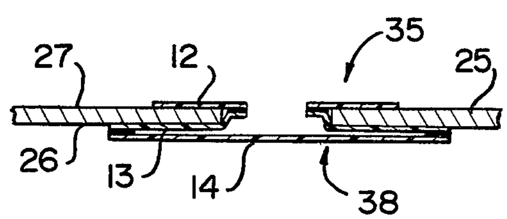
FIG.5
FIG.3
INVENTOR
GLENN A. SHEWMAKE
BY Hurvitz & Rose
ATTORNEYS United States Patent Office 3,494,820
Patented Feb. 10, 1970

3,494,820

PATCH FOR REPAIRING PUNCTURES IN INFLATED ARTICLES AND ARTICLE SO REPAIRED

Glenn A. Shewmake, Trevilians, Va., assignor to Melpar Inc., Falls Church, Va., a corporation of Delaware Filed June 7, 1966, Ser. No. 555,860
Int. Cl. B32b 7/14, 3/10
U.S. Cl. 161—113 4 Claims

ABSTRACT OF THE DISCLOSURE

An insertable patch for sealing a puncture in the wall of an inflatable article includes three resilient, gas impervious, substantially coextensive flaps arranged in overlying relationship. An outer flap and the middle flap have central aligned holes and are bonded together around the entire coincident edge of the holes to form a common neck portion therebetween. The other outer flap is bonded to the middle flap around the entire coincident curved boundary or perimeter of those two pieces, to form a chamber which is gas-tight except for the central axis hole via the aforementioned common neck portion. To seal a puncture the two flaps comprising the chamber portion are inserted into the puncture hole by distorting those two flaps into an elongated shape with a probe pushed against the interior of the chamber via the central access hole of the patch. The patch then tends to reassume its original shape, very quickly when the article is being repaired while inflated, as a result of gas pressure on the flap forming the bottom of the chamber, with confronting surfaces of the flaps having the common neck positioned against and conforming to the contour of respective opposite surfaces of the article wall.

The present invention relates generally to means for repairing inflatable objects, and more particularly to apparatus for facilitating the repair of a damaged inflatable object while the object is still under pressure and during adverse environmental conditions.

It is a primary object of the present invention to provide patch structures which are insertable into punctures or breaks in the wall of an inflatable article, such as a liferaft, life preserver, or life vest, to effect emergency repair while the article is pressurized and being utilized, and which are effective to maintain the pressure of the inflated article indefinitely.

Heretofore, a large number of patches for inflatable articles have been proposed, some of which are insertable into the puncture to close the leak. However, most of these patches have been of relatively complex structure, and difficult and expensive to manufacture, where the requirement of patch insertion is presented in order to effect the repair. Moreover, the prior art insertable patches have often failed after relatively short periods of time and are usually considered to be only a temporary expedient. More importantly, such patches have generally been completely ineffective where repair is attempted while the article is under pressure, or where repair is necessary under adverse conditions of low temperature, high humidity, high altitude; or during submergence of the inflated article in water. One or more of these severe conditions are frequently encountered during the use of inflated survival equipment, e.g., lifeboats, liferafts and the like, and the fact that this equipment has as its sole purpose the sustenance of human life points up the futility of its serving the desired purpose absent a repair kit for servicing and for reliably maintaining pressure in the event of puncture, rupture at a weak point, or any other emergency break.

A typical prior art repair patch carried in the survival kit for a 20 man liferaft comprises a rubber plug having a tapered threaded shank for screwing the plug into small punctures occurring, for example, when the raft collides with foreign objects in the water or in some instances, upon unintentional wall contact by equipment or utensils carried by personnel aboard the raft. The threaded plug has been found to be ineffective for maintaining raft inflation pressure over an extended period of time and is of no avail where the puncture or break is relatively large.

Briefly, according to a preferred embodiment of the present invention the repair patch comprises three oval or circular pieces of flexible or resilient gas impervious material, such as rubber, each piece having a thickness substantially equal to the wall thickness of the inflatable article to be repaired. Two of these pieces are provided with centrally disposed holes, which are aligned, and the two pieces sealed together in overlying relationship at the hole edges, so that an access hole is formed. The third piece is situated in flat superposed relationship on one of the above-mentioned two pieces, and sealed thereto along the outer periphery, thereby forming a chamber with an opening at the access hole. This repair patch is insertable into the puncture while the inflated article is pressurized, either by use of a blunt probe which is adapted to be accepted by the patch access hole or by oral inflation of the chamber via the access hole, so that the peripherally sealed portion of the patch is disposed adjacent the inner surface of the article wall while a flap portion at which the access hole is exposed is located adjacent the outer surface of the article wall. Either or both surfaces of the patch which are to be disposed adjacent the wall surfaces may be coated with adhesive prior to insertion, or the exposed flap only may be adhesively sealed to the article wall after insertion of the patch. The adhesive, together with the normal inflation pressure, provides an extremely reliable and positive seal of the puncture. I have also found that the patch maintains inflation pressure over extensive periods of time under the force exerted by the gas pressure of the inflated article alone, i.e., without adhesive, although the use of adhesive is preferred for greater reliability.

Accordingly, it is another object of the present invention to provide a repair patch for inflatable articles which is insertable into punctures and which comprises a pair of relatively flat resilient portions fastened together to form a first flap for overlying contact with the outer surface of the inflated article wall about an area thereof bounding the puncture, and a second flap for overlying contact with the inner surface of the inflated article wall about an area substantially coextensive with the first-mentioned area.

The above and still further objects, features and attendant advantages of the invention will become apparent from a consideration of the following detailed description of a preferred embodiment thereof, especially when taken in conjunction with the accompanying drawings, in which:

FIGURE 1 is a plan view of a repair patch according to the invention;

FIGURE 2 is a sectional view of the repair patch taken along the lines 2—2 of FIGURE 1; and FIGURES 3–5 are sectional views demonstrating the manner in which the patch is applied to seal a leak in the wall of an inflatable article.

Referring now to the drawings, and in particular to FIGURES 1 and 2 thereof, repair patch 10 comprises three flat flexible pieces 12, 13, 14 of a material impervious to gas, such as rubber, each having a substantially oval shape, for example. Pieces 13 and 14 are substantially coextensive and are sealed together about their periphery 15, such as by heat sealing or by use of a permanent adhesive, to form a chamber 17 communicating with the atmosphere via an access hole 20. The access hole is formed by a pair of holes, centrally disposed in pieces 12 and 13, which are aligned with the two pieces placed in overlying relationship and sealed together about the edges of the holes to provide a neck portion 22. Pieces 12 and 13 should be sufficiently separated to accept the wall thickness of the damaged article therebetween.

Piece 12 may be substantially coextensive with the areas of the other two pieces, or may encompass a smaller area, as shown, provided only that each area is sufficiently large to cover a relatively wide unbroken portion of the wall in which the puncture is located. It will, of course, be apparent that the repair patch may be manufactured in a wide range of sizes and shapes to seal ruptured wall areas ranging from pinhole punctures to relatively large breaks.

The patch essentially comprises a first flap portion formed in this embodiment by sealed pieces 13 and 14, adapted to contact the inner surface of the wall of the inflatable article under repair, and a second flap portion, formed here by piece 12, centrally fastened to the first flap portion and adapted to reside in contact with the outer surface of the wall under repair.

During emergency conditions, the patch 10 may be utilized to seal a puncture in the wall of an inflated article in the manner shown by the sequence of FIGURES 3, 4 and 5. Adhesive may be applied to the surfaces of the patch adapted to contact the wall surfaces 25, 26 of the inflated article, after which a blunt probe 30, which may be furnished in the repair kit, is inserted into the access hole 20 of the patch and used to push the aforementioned second flap portion into the hole within wall 27 (FIGURE 3). Alternatively, the patch chamber 17 may be orally inflated via access hole 20 and the second flap portion inserted into the puncture.

FIGURE 4 shows the shape of the patch as probe 30 is partially withdrawn from chamber 17, the patch tending to assume its original flattened shape by virtue of the resiliency of the material of which it is composed and the pressure of the gas within the inflated article on the second flap portion. In FIGURE 5, the patch is shown in its final position relative to the puncture and the wall area bounding the puncture. First flap portion 35 is disposed in overlying contact with surface 25 of wall 27 and second flap portion 38 disposed in overlying contact with surface 26 of wall 27. The outer flap 35 may be smoothed by hand to insure adhesion with wall surface 25. In this manner, repair patch 10 provides two separate seals, i.e., a redundancy feature for reliability, one between outer flap and outer wall surface and the other between inner flap and inner wall surface. Adhesion of the inner flap is assured by virtue of the gas pressure thereon.

As previously mentioned, it has been found that the resiliency of the patch enables sealing of leaks for extended periods of time under sufficient inflation pressure, i.e., provided a large quantity of the pressurizing gas has not been permitted to escape prior to insertion of the patch, without need for adhesive. Of course, adhesive should be used if available.

I claim:

1. A kit installed to repair a puncture in the wall of an inflated article, comprising a repair patch including three thin sheets of resilient rubber-like gas-impervious material arranged in overall surface contact in sandwiched overlying relationship, one outer sheet and the middle sheet each having centrally mutually aligned holes, said one outer sheet and said middle sheet being sealed together only along the entire edges of the aligned holes, the other outer sheet being sealed to said middle sheet only along the entire periphery thereof to form a chamber communicating with the atmosphere via said edge-sealed aligned holes; said middle sheet and said other outer sheet being constrained into sealing position with respect to said puncture by air pressure in said inflated article, in which sealing position said one outer sheet is sealed against and follows throughout its area the contour of the outer surface of said wall of said inflated article and said middle sheet is sealed against and follows throughout its areas the contour of the inner surfaces of said wall of said inflated article, the transverse dimensions of each of said sheets being about twice the transverse dimensions of said puncture, the transverse dimensions of said mutually aligned holes being approximately equal to the transverse dimensions of said puncture.

2. A patch for sealing a puncture in the wall of an inflatable article while said article is inflated, said patch comprising first, second and third resilient gas-impervious members, said first and second members each having a central hole aligned with the hole in the other, and sealed together in gas-impervious relationship in a region adjacent the common edge of the holes with said first and second members aligned in substantially coextensive overlying contact, confronting surfaces of said first and second members lying normally in non-adherent contact with one another except along said sealed region, said second and third members sealed together in gas-impervious relationship about their entire common periphery with those two members aligned in substantially coextensive overlying contact, confronting surfaces of said second and third members lying normally in non-adherent contact with one another except along said sealed periphery, to form a chamber accessible via the edge-sealed hole in said first and second members, whereby said chamber may be distorted to increase its length along the axis of the hole and thereby reduce the width of said second and third members to permit insertion of the last-named members into said puncture, after which said chamber reassumes its original shape such that said non-adherent confronting surfaces of said first and second members lie in substantially continuous contact and contour conformance with respective opposite surfaces of said wall in a large region, relative to the size of said puncture, encompassing the entire puncture.

3. A patch for a hole in a sheet, said sheet having an upper surface and a lower surface, said patch including three adjacent generally parallel walls, a first of said walls having a first opening and said first of said walls having a wall area greater than the area of said hole and arranged to extend well beyond said hole on said upper surface, the intermediate one of said walls having a second opening communicating with said first opening and having an area greater than the area of said hole and arranged to extend well beyond said hole on said lower surface, and a third of said walls being unapertured and joined to said intermediate one of said walls in a complete circle surrounding said second opening, whereby when said patch is installed the first of said walls is adhered over said upper surface with its aperture aligned with said hole and said intermediate of said walls is adhered to said lower surface and said third of said walls provides a closure for said hole.

4. The combination according to claim 3, wherein the facing surfaces of said first and second walls have surfaces adherent to said sheet.

References Cited

UNITED STATES PATENTS

| | | | |
|---|---|---|---|
| 1,456,403 | 5/1923 | Ranney | 156—293 |
| 3,044,920 | 7/1962 | Dewar | 156—94 |

ROBERT F. BURNETT, Primary Examiner

R. H. CRISS, Assistant Examiner

U.S. Cl. X.R.

161—147; 156—293